Oct. 30, 1951 — E. P. VAN LEUVEN — 2,573,371
GEMSTONE MACHINE
Filed Dec. 15, 1947 — 9 Sheets-Sheet 4

INVENTOR.
Edwin P. Van Leuven
BY
Stuart M. Maule
ATTORNEY.

INVENTOR.
Edwin P. Van Leuven
BY Stuart M. Maule
ATTORNEY.

Patented Oct. 30, 1951

2,573,371

UNITED STATES PATENT OFFICE 2,573,371

GEMSTONE MACHINE

Edwin P. Van Leuven, Bakersfield, Calif.

Application December 15, 1947, Serial No. 791,684

17 Claims. (Cl. 51—101)

This invention relates to machines for grinding and shaping gemstones, and more particularly relates to machines for making cabochon-cut gemstones, and has for an object the provision of a machine which will accomplish the steps of rough-grinding a gemstone to approximately the desired size, cutting a bezel on the rough-ground gemstone, grinding a crown on the gemstone, and polishing the gemstone. Inasmuch as the term "reducing" is commonly used in lapidary art to describe each of these various steps, as well as the entire process of shaping and surface finishing a gemstone, that term will be employed hereinafter as a generic expression indicating any one of the steps of rough grinding, finish grinding, or polishing.

Another object of the invention is to provide a machine having facilities for mounting a piece of gemstone material and placing it in contact with various reducing wheels in such a manner as to permit the aforesaid steps to be rapidly and efficiently accomplished.

A more detailed object of the invention is the provision in a gemstone machine of an adjustable head mechanism for holding a piece of gemstone material so as to promote the reduction of said material to any selected predetermined shape, bezel angle cut, and crown curve cut by suitable reducing wheels.

Still another object of the invention is to provide in a gemstone machine automatic mechanism for causing rotating, rocking, and oscillating movement of the gemstone material while holding said material in contact with revolving reducing wheels.

Still another object of the invention is to provide in a gemstone machine having mechanical, as well as manual, means for feeding the gemstone material to the reducing wheels.

A further object of the invention is the provision of means in a gemstone machine for manually or automatically controlling the feeding of the work to the reducing wheels and for stopping the feeding action after predetermined cuts have been made.

A still further object of the invention is to provide in one machine a series of reducing wheels with which to rough out, shape, and polish a piece of gemstone, the machine being so arranged that, once adjusted to produce a product of a certain shape, a plurality of gemstones may be cut and finished to that shape without further adjustment.

Referring to the drawings.

Specifically describing the preferred embodiment of my invention, my gemstone machine comprises a head mechanism A movably mounted upon a base B, a grinding wheel C with coolant facilities also adjustably mounted upon the base B, and an assembly D of finishing wheels operably mounted on the base B, the wheels C and D being herein collectively termed reducing wheels. The head mechanism A is movable as a unit at right angles to the planes of rotation of the grinding wheel C and of the assembly D so as to feed a workpiece of gemstone material 10 to the various wheels; and the grinding wheel C is movable to bring its working rim adjacent to the axis of movement of the head mechanism.

The base B supports a frame 11 provided with bed rails 12 upon which a bed plate 13 is slidably mounted by means of bed ways 14 cooperating with the rails 12. The bed plate 13 carries an apron 15 supporting a crank 16 for operating a pinion 17 which engages a rack 18 secured to the frame 11 so as to move the bed plate 13 and the hereinafter described parts supported thereon along the rails 12. The bed plate 13 may be secured in any selected position relative to the wheels C and D by means of a locking arm 19 held to the bed plate by a bolt 20 and adapted to be clamped to the under side of the frame 11 by a crank 21 threaded on the bolt 20.

The bed plate 13 supports a platform 23 having compound ways for sliding movement thereon by which the platform may be moved either longitudinally, that is, parallel to the bed rails 12, or transversely at right angles to the bed rails. The platform 23 is secured to the upper longitudinal way member 24, which rests upon and is slidably keyed to the intermediate member 25 for longitudinal movement. The intermediate member 25 rests upon the lower cross-feed way member 26, and is slidably keyed thereto for transverse movement, all in the manner well known in compound lathe construction. The lower cross-feed way member 26 is secured to the bed plate 13. The platform 23 in turn supports a worm wheel 27, held rotatably thereto by a vertical shaft 28 and thrust ball bearing 29. The shaft 28 is threaded to receive a castellated nut 30, set and cotter-pinned to hold the worm wheel 27 snugly and yet permitting it to revolve stiffly.

Figures 16, 17:
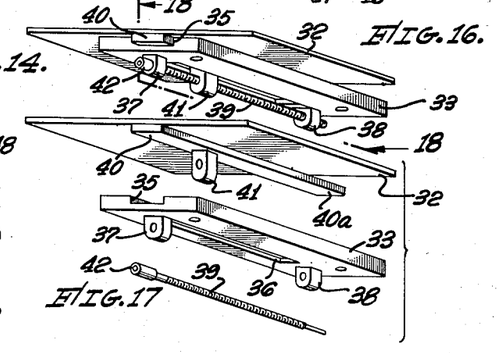
Figure 16 is a perspective view of the crown cross-ways or slide-ways upon which the rotating gemstone-holding part of the head mechanism may be advanced and retracted to obtain a predetermined crown cut, the parts being shown in assembled form, and the view point being from below the slide-ways.
Figure 17 is an exploded view similar to Figure 16, but with the parts separated from each other.
Figure 18:
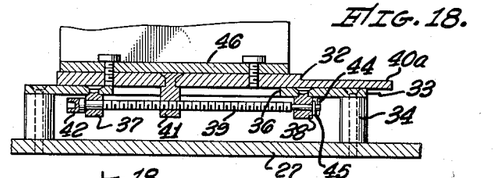
Figure 18 is a medial vertical sectional view taken on the line 18—18 of Figure 16, and somewhat enlarged in scale, with the direction of view as indicated.

Another sliding platform mechanism, which I term the crown curve ways 32 because of its hereinafter described function in the cutting of a crown curve upon a gemstone and which is illustrated in detail in Figures 16 to 18, is supported upon the worm wheel 27. The base plate 33 of the crown curve ways 32 is supported above the worm wheel 27 by four hollow posts 34 and is bolted through the posts solidly to the worm wheel. The base plate 33 has a slot 35 milled in its upper surface diametrical to the worm wheel 27 and normally parallel to the bed rails 12, although of course it may be turned at an angle thereto by rotation of the worm wheel 27. Intermediate of its ends, the slot 35 is continued through the base plate 33 to form a narrower longitudinal opening 36. Secured to the bottom surface of the base plate 33 adjacent the ends of the opening 36 and aligned therewith are lugs 37 and 38, drilled to receive the unthreaded end portions of a screw 39. The crown curve ways 32 has on its lower surface a ridge 40, fitting slidably in the slot 35 and bearing a threaded lug 41 which fits slidably in the opening 36 and is adapted to receive the threaded central portion of the screw 39. The crown curve ways 32 is shorter than the ridge 40 so as to leave a portion 40a of the ridge 40 extending outwardly therefrom. When the parts 32 to 41 are assembled, as shown in Figures 16 and 18, the insertion of the screw 39 through the lugs 37, 41, and 38 holds the parts together and permits moving the ways 32 along the plate 33 along a radius of the worm wheel 27 when the screw 39 is turned. The extended portion 40a then has its upper surface flush with the upper surfaces of the base plate 33 on both sides of it, and lies exposed therebetween. The screw 39 has a non-circular hollow head 42 to receive a removable crank (not shown) and is retained in the lugs 37 and 38 by a cotter pin 44 and washer 45 at its end opposite the head 42.

Figure 6:
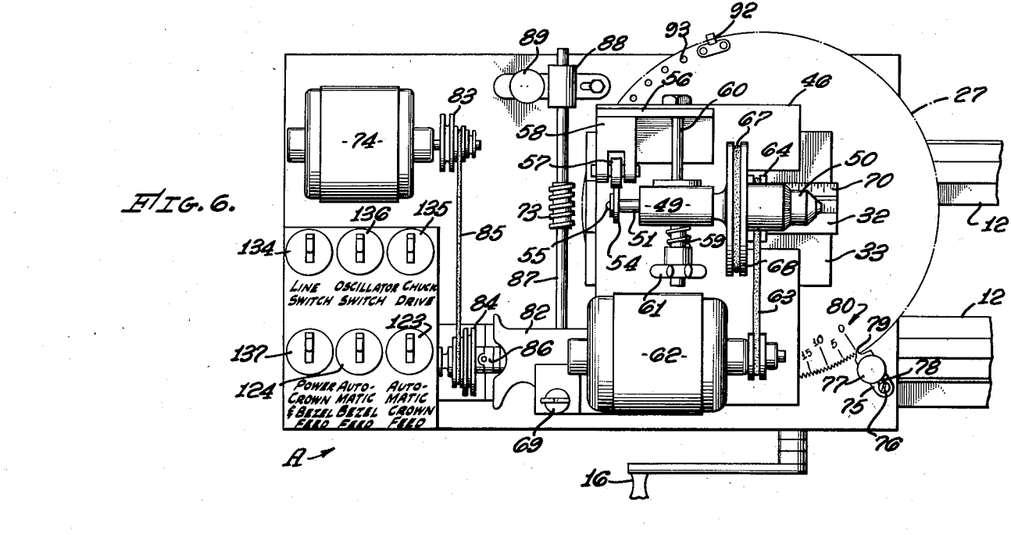
Figure 6 is a plan view of that part of the machine illustrated in Figures 4 and 5.
Figures 8, 8B:
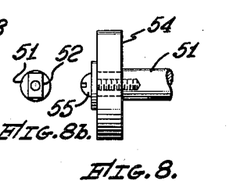
Figures 8, 8a, and 8b are detailed views on a further enlarged scale illustrating the method of securing the template cam to its spindle.
Figure 8A:
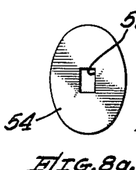
Figure 9:
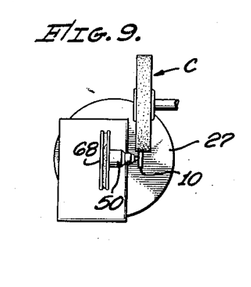
Figures 9 to 12 are detail plan views showing the head mechanism in four different positions relative to the grinding wheel and, respectively, for the purposes of (Figure 9) cutting a bezel perpendicular to the base of a gemstone, (Figure 10) cutting a bezel at 15° to the base, (Figure 11) starting a crown cut, and (Figure 12) finishing a crown cut.
Figure 10:
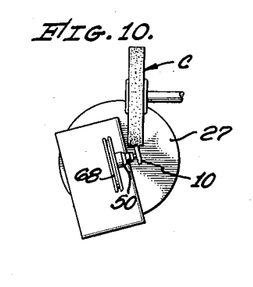
Figure 11:
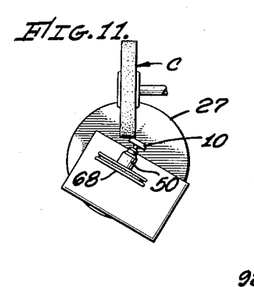
Figure 12:
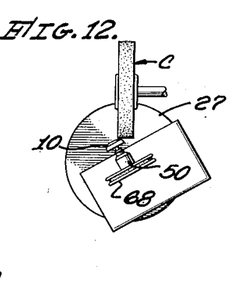

A plate 46 is bolted to the crown curve ways 32 for supporting thereon the mechanism for rocking and rotating the gemstone 10. Bearings 47, rigidly secured to the plate 46, support rotatably the lower end of a rocker arm 48, which has bearings 49 at its upper or distal end. A chuck 50 for holding the gemstone is mounted on one end of a spindle 51 which is supported in the bearings 49 and extends therebeyond, as best shown in Figure 6. The other end 52 of the spindle 51 is rectangular to engage a similarly shaped opening 53 in a cam 54 which is held to the spindle 51 by a screw 55, all shown in Figures 8, 8a, and 8b. A bracket 56, rigidly secured to the plate 46 supports a follower wheel 57 mounted in bearings 58 so that the follower wheel is engageable by the cam 54, to cause the spindle to rock back and forth in a direction transverse to its longitudinal axis. Continuous contact of the cam 54 with the follower wheel 57 is maintained by the pressure of a compression spring 59 mounted on a bolt 60 and held between the rocker arm 48 and a tension adjusting knob 61. The bolt 60 is suspended freely in the bracket 56, and works loosely through a slot (not shown) in the rocker arm 48 which permits the rocker arm to have arcuate movement relative to the bolt.

To rotate the spindle 51 a motor 62 is mounted on the plate 46, the power being transmitted through a belt 63 to a pulley 64 on a jack shaft 65 revolubly mounted on the plate 46 in axial alignment with the bearing 47 of the rocker arm, and from another pulley 66 on the jack shaft by a belt 67 to a pulley 68 on the spindle, so that the spindle may be rocked by the rocker arm 48 without increase or decrease of the distances between pulley centers. Because some materials reduce better while rotating towards a grinding wheel as if in mesh therewith, while others reduce better when rotated oppositely, the motor 62 is preferably a reversing motor and is controlled as to direction of rotation by a reversing switch 69.

By turning the worm wheel 27, the angle of approach of the gemstone 10 to the reducing wheels C and D may be altered and, as will be seen, the angle of approach may be a constant one or may be continuously varied by oscillation of the worm wheel.

Figure 19:
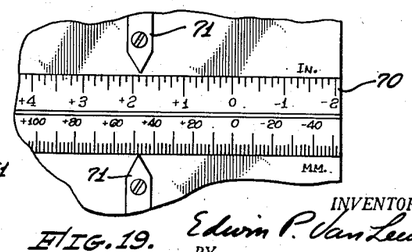
Figure 19 is a greatly enlarged fragmentary plan view of the position-indicating scale upon the crown crossways.
Figures 20, 21, 22, 23, 24, 25:
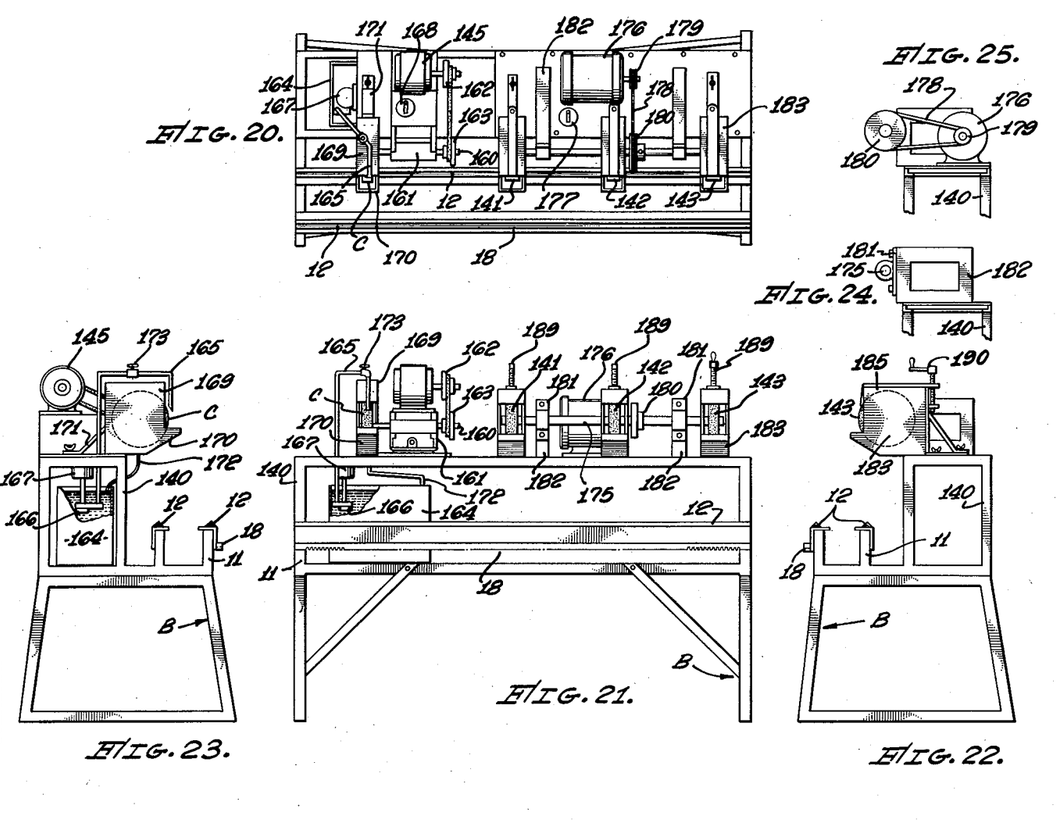
Figure 20 is a plan view of the machine, substantially on the scale of Figure 1, showing the machine with the head mechanism removed.
Figure 21 is a frontal elevational view of the machine in the condition illustrated in Figure 20.
Figures 22 and 23 are, respectively, right and left end elevational views of the machine as shown in Figures 20 and 21.
Figure 24 is a detail view in elevation of the mounting for the shaft carrying the various reducing wheels.
Figure 25 is a similar view of the drive mechanism for said shaft.

As hereinafter described, in the operation of cutting a crown on a gemstone, the crown curve is determined by setting the gemstone so that its finished surface is a predetermined distance from the axis around which the gemstone is arcuately oscillated. This axis, in the present construction, coincides with the axis of the worm wheel 27. Accordingly, a scale 70, shown in Figures 6 and 19, is secured to the upper surface of the extended ridge portion 40a of the crown curve ways 32, with pointers 71 secured to the adjacent surfaces of the base plate 33. The scale 70 is graduated, as a matter of convenience, both in inches and in millimeters, the scales extending in both directions from the zero line. When the pointers 71 are at the zero line, the finished surface at the center of a gemstone held in a chuck 50 will be exactly over the center of the worm wheel 27, and will therefore be, itself, a center of rotation but will not be arcuately oscillated.

Arcuate oscillation of all of the parts 32 to 71 mounted on the worm wheel 27, including objectively the gemstone work piece 10, is attained by means of a worm 73 driven by a motor 74. Alternatively the worm wheel 27 may be moved and posited manually. To a fore corner of the platform 23 there is slidably secured a toothed bracket 75, held thereto by a screw 76 and by a knurled knob 77, both of which have shanks extending slidably through a slot 78 in the proximal lower arm of the bracket 75 and are threadedly engaged in the platform 23. The screw 76 is tensioned only slightly so that the bracket 75 may be readily moved in and out from the worm wheel 27 when the knob 77 is loosened. By moving the bracket 75 inwardly so that its tooth 79 is engaged in one of the threads of the worm wheel 27, and then tightening the knob 77, the worm wheel may be locked in any desired position. On the upper surface of the worm wheel is a scale 80 graduated in degrees. The worm wheel preferably is provided with three hundred and sixty teeth so that each space equals one degree of circumference and any setting between the graduations of the scale 80 may be conveniently made. When the knob 77 is loosened, the bracket 75 may be slid outwardly from the worm wheel 27, leaving the latter free to be moved by the motor 74.

Figure 32:
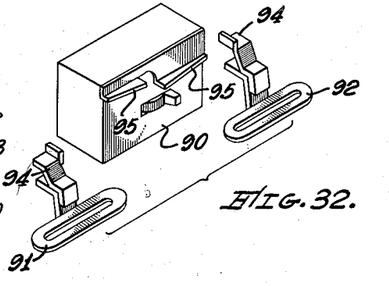
Figure 32 is a perspective elevational view of a reversing switch and the associated wiper arms utilized to give horizontal rotary oscillating movement to the head mechanism.

The motor 74 is a reversing motor so as to impart oscillating movement to the worm wheel 27, and operates through a right angle reduction gear 82. Stepcone pulleys 83 and 84 are provided upon which a belt 85 rides to permit variations in the speed of oscillation of the worm wheel 27, and a flexible joint 86 is interposed to absorb the shocks of reversed movement. The reduction gear 82 drives a shaft 87 upon which the worm 73 is mounted, and the distal end of the shaft is held in a movable bearing 88. By loosening and tightening a knurled knob 89, the bearing 88 may be moved or may be locked in position so as to hold the worm 73 either in mesh or out of mesh with the worm wheel 27, the latter condition obtaining when it is desired to rotate the worm wheel manually and to lock it by means of the toothed bracket 75. The flexible joint 86, in addition to absorbing shocks, permits the aforesaid lateral shifting movement of the shaft 87 and worm 73. The motor 74 is reversibly controlled by a reversing switch 90 which is automatically reversed by wiper arms 91 and 92, shown in detail in Figure 32. The periphery of the worm wheel 27 is provided with a plurality of spaced bolt holes 93 which permit the positing of the wiper arms 91 and 92 at each side of the reversing switch 90 and at selected radial angles apart. When the worm wheel 27 is rotated so that either of the wiper arms makes contact with the switch 90, the switch will reverse the motor 74 and consequently the direction of rotation of the worm wheel. As is customary with reversing mechanism of this nature, the wiper arms are provided with stop-brackets 94 having different levels and adapted to contact similarly vertically spaced lugs 95 on the box of switch 90 to prevent injury to the switch toggle.

Figure 4:
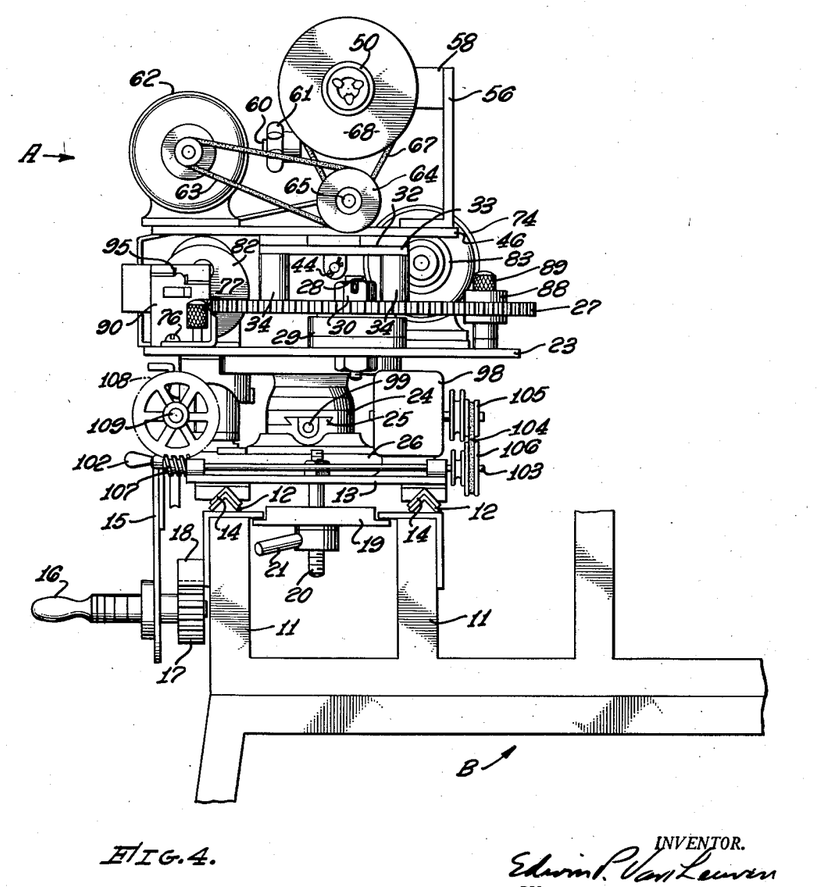
Figure 4 is an end elevational view from the same aspect as Figure 3, but on an enlarged scale showing details of the head mechanism, portions of the figure being broken away to reduce its size.
Figure 7:
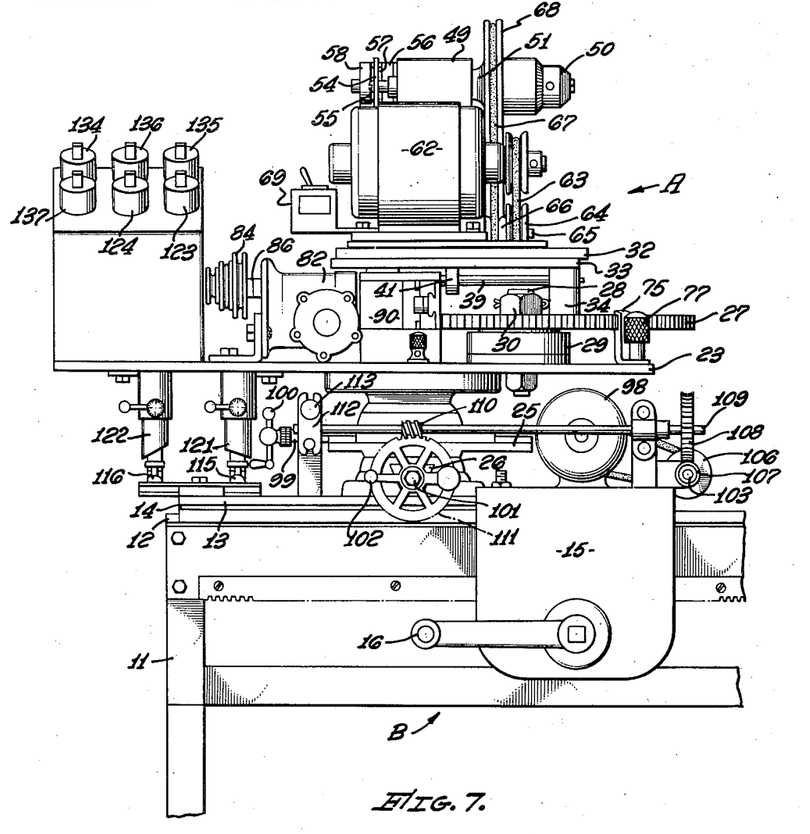
Figure 7 is a frontal elevational view thereof.

The platform 23 may also be moved manually in either of its possible directions on the way members 24, 25, and 26, and may be moved in its transverse direction by a motor 98. For longitudinal movement a way screw 99, shown in Figure 4, is operated by a hand crank 100 (see Figure 7) to move the upper longitudinal way member 24 upon the intermediate way member 25. For transverse manual operation, a cross-feed way screw 101 (Figure 7) is operated by a hand crank 102, keyed thereto, to move the intermediate way member 25 upon the lower cross-feed way member 26. To obtain electrically operated transverse motion, the motor 98 drives a shaft 103 at the right hand end of the head mechanism A (Figure 4) through a belt 104 on cone pulleys 105 and 106 which afford a choice of speeds. The shaft 103 carries a worm 107 which engages a worm wheel 108 on a shaft 109 disposed longitudinally on the forward side of the head mechanism A (Figure 7). The shaft 109 carries a worm 110 which engages a worm wheel 111 keyed to the cross-feed way screw 101. Thus, operation of the motor 98 serves to move the platform 23 rearwardly, forward motion being obtained by the hand crank 102. If it is desired to operate entirely by the hand crank 102, the worm 110 may be disengaged from the worm wheel 111 by loosening movable bearing 112. The bearing is provided with a fastening knob 113 which, when loosened, permits the bearing to be raised so as to raise that end of the shaft 109 and so unmesh the worm 110 from the worm wheel 111.

Figure 5:
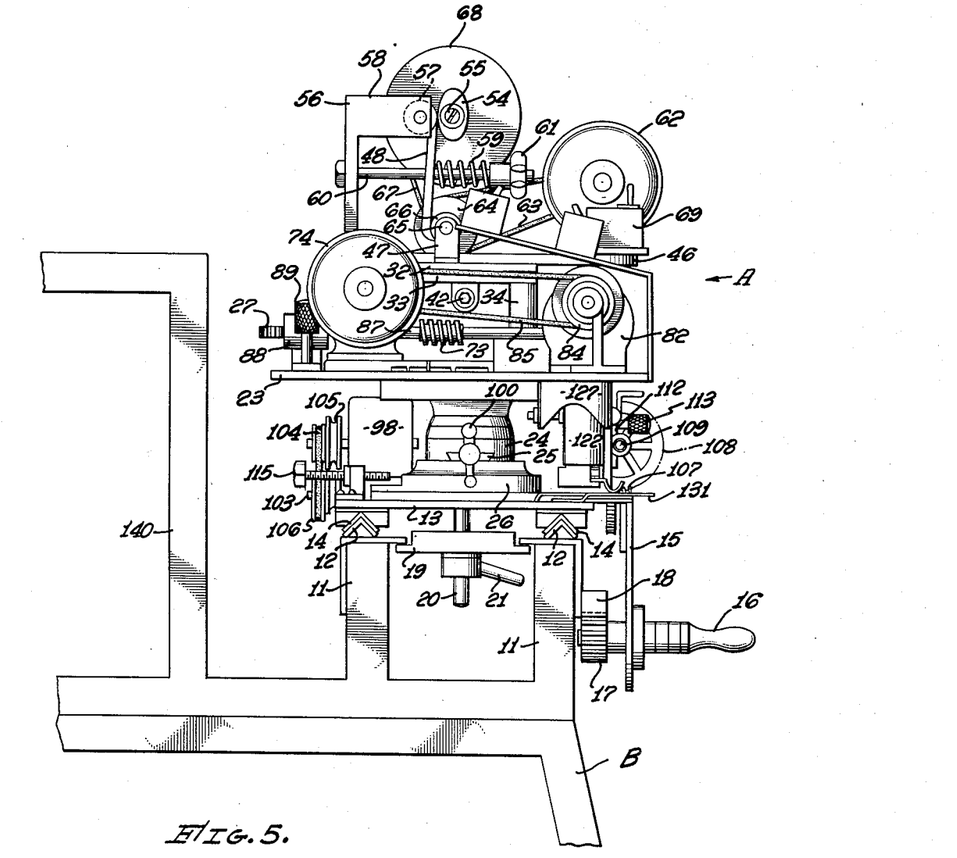
Figure 5 is an end elevational view on the same scale as Figure 4, taken from the opposite or left hand end of the machine, and illustrative only of the head mechanism and the mounting thereof.

To limit the transverse, or cross-feed, motion of the platform 23, and operative for either manual or electrical operation, a pair of dead-stops 115 and 116 are disposed on the rearward side of the bed plate 13 so as to make contact with the intermediate way member 25 (see Figure 5).

Figures 28, 29, 30, 31, 33, 34, 35, 36:
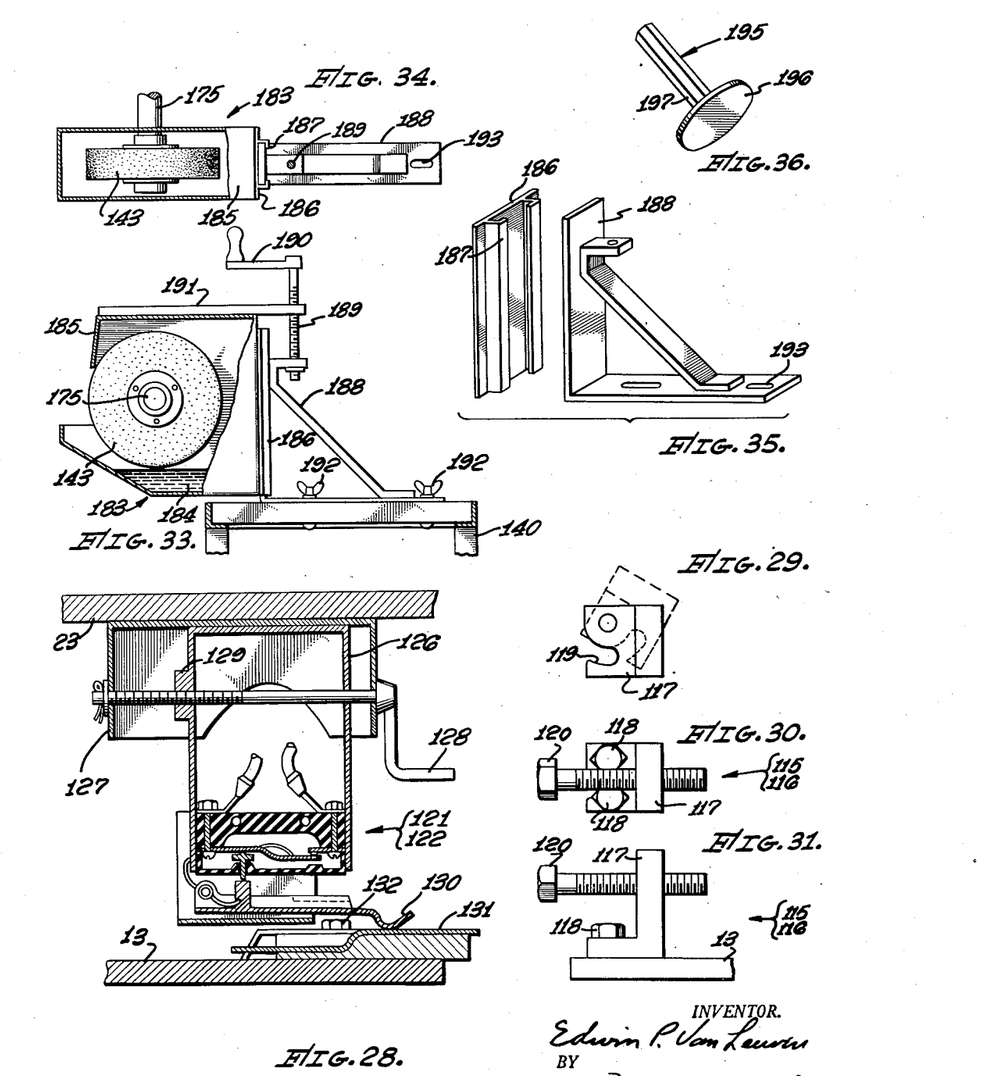
Figure 28 is a greatly enlarged vertical sectional view of a micro-switch used to arrest the feeding movement of the head mechanism in connection with making a crown cut.
Figure 29 is a detail view in plan of a swivel mounted bracket for holding a "dead-stop" for arresting movement of the head mechanism in connection with making a bezel cut.
Figure 30 is a plan view of the bracket shown in Figure 29, with the "dead-stop" bolt in place.
Figure 31 is an elevational view of the bracket and "dead-stop" shown in Figures 29 and 30.
Figure 33 is an elevational view of a hood for one of the reducing wheels and of the mount therefor.
Figure 34 is a plan view of the details shown in Figure 33.
Figure 35 is a perspective, exploded view of the brackets for holding the hoods so that they may be raised and lowered.
Figure 36 is a perspective view on an enlarged scale of a dop to which a gemstone is cemented preparatory to grinding.

These dead-stops are alike in construction, as illustrated in Figures 29 to 31, and comprise a bracket 117 held pivotally to the bed plate 13 by two bolts 118, one of which extends through an arcuate slot 119 so that, when loosened, it permits pivotal movement of the bracket about the other. A stop pin 120 is threaded in the upper arm of the bracket 117 so as to be adjustable therein to arrest the intermediate way member 25 at a predetermined limit of travel. The dead-stops 115 and 116 are dual so that, as hereinafter more fully explained, one may be adjusted to limit the cross-feed motion in the operation of rough-shaping a gemstone and cutting a bezel, and the other may be adjusted to limit the cross-feed motion in the operation of cutting a crown, both being left in adjustment when a plurality of gemstones are to be cut to the same shape, and that one determining the shortest limit of cross-feed travel being pivoted out of the way when the other is in use.

For the same purpose, dual micro-switches 121 and 122 are secured to the under surface of the platform 23 and arranged to break the current to the motor 98 when the desired limits of cross-feed travel are attained. The micro-switches 121 and 122 are in series respectively with a pair of snap switches 123 and 124 which provide parallel circuits for the motor 98, the circuit 123—121 being used for crown cutting and the circuit 124—122 being used for bezel cutting.

The micro-switches 121 and 122 are alike and are illustrated in detail in Figure 28. Each comprises a switch box 126 mounted slidably in a hood 127 attached to the under surface of the platform 23 and extending downwards therefrom. The box 126 is arranged to be adjustable within the hood by a crank 128, held rotatably by the hood and having a threaded portion engaging a lug 129 on the switch box. The interior arrangement of the micro-switch is the conventional one of contact points held yieldingly open and closable by a slight movement of the distal end of a contact arm 130, and the device is illustrated merely to show the means for adjusting it. Associated with each of the micro-switches 121 and 122 is a contact plate 131 mounted upon the bed plate 13 in the path of movement of the contact arm 130 of the associated micro-switch. The contact plate normally holds its associated contact arm 130 elevated by riding upon the upper surface thereof, as shown in Figure 28, thus closing the associated circuit and maintaining supply of current to the motor 98. However, the after end of the contact plate 131 is depressed, with the result that when the platform 23 reaches the limit of its rearward travel, as determined by the setting of its associated micro-switch, the arm 130 will drop to a lower position, opening the associated circuit and stopping the motor 98. In addition to the adjustment afforded by the crank 128, the contact plate 131 is adjustably secured to the bed plate 13 by a bolt 132. By shifing the contact plate 131 so as to change the position of its shoulder, which presses the contact arm 130 upwardly, the locus of the setting range afforded by the crank 128 may be altered.

Figure 27:
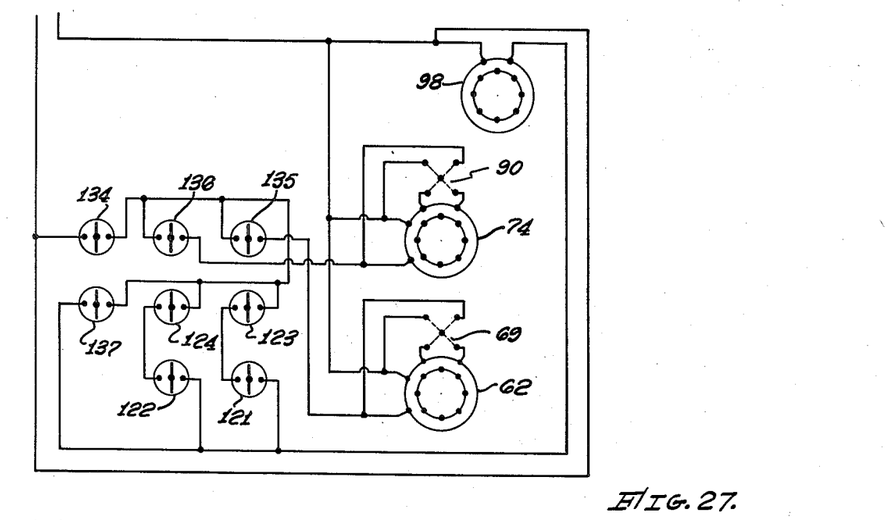
Figure 27 is a diagrammatic view of that part of the wiring system which is carried by the head mechanism.

The electrical wiring system for the three motors 62, 74, and 98 carried by the head mechanism A and operable as above described to move the parts thereof, is illustrated in Figure 27. A line switch 134 controls the input of power to the three motor circuits. Individual snap switches 135 and 136 control power to the motors 62 and 74, respectively. The snap switches 135 and 136 are respectively supplemented by the reversing switches 69 and 90, by which the motor 62 may be reversed to change the direction of grinding on the gemstone, and the motor 74 may be automatically reversed to oscillate the worm wheel 27. Three parallel circuits lead to the motor 98. One of them, leading directly thereto, is controlled by a snap switch 137, and is used when it is intended to limit the cross-feed travel by means of the dead stops 115 and 116, or by opening the switch 137. The other two circuits are those already described as leading to the motor 98 through the snap switch 123 and micro-switch 121, and through the snap switch 124 and micro-switch 122, for respectively limiting the cross-feed travel of the operations of crown cutting and bezel cutting when a plurality of like shaped stones are to be produced.

The base B supports a second frame 140 upon which are supported the grinding wheel C and the assembly D of finishing wheels, best shown in Figures 20 to 25. The number and nature of these wheels may vary according to the type and hardness of the gemstones and the finsh which is desired. The grinding wheel C is usually a silicon carbide wheel. By way of illustration, I have shown three finishing wheels, a cast iron lap wheel 141, a hard felt sanding wheel 142 and a leather buffing wheel 143, but for certain work I have used as many as five finishing wheels, including both wet and dry sanding cloth wheels, and on other work it is not necessary to use all the wheels herein shown. I have also used diamond wheels for wheels C, 141 and 142.

Figure 13:
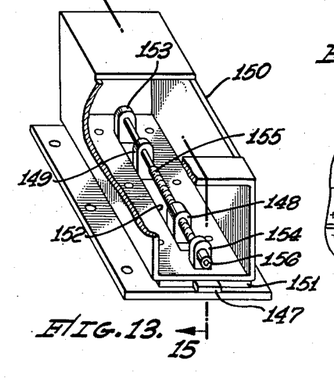
Figure 13 is a perspective view of the grinding wheel base, showing the parts assembled, with housing parts broken away to illustrate interior details.
Figure 14:
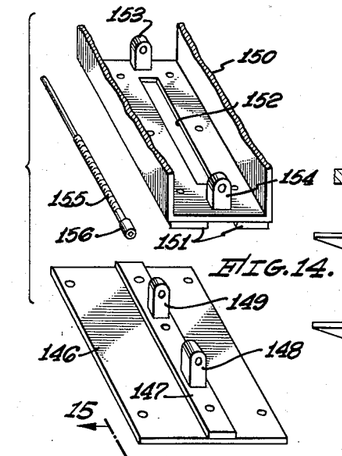
Figure 14 is a perspective view, exploded, showing the parts of the grinding wheel base of Figure 13 separated from each other.
Figure 15:
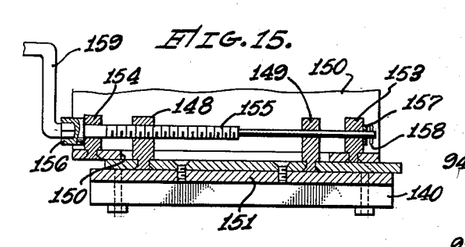
Figure 15 is a medial vertical sectional view taken on the line 15—15 of Figure 13, with the direction of view as indicated.

The grinding wheel C is driven by a motor 145 and both the wheel and the motor are mounted on a cross-feed ways mechanism, illustrated in Figures 13, 14, and 15, by which the axis of the wheel may be moved towards and away from the longitudinal axis of the whole machine, so as to permit moving the grinding wheel toward the work as the wheel wears or is dressed away. This cross-feed ways mechnism is, except for minor details and being inverted, similar to the crown curve ways 32 and is similarly operated. A base plate 146 is bolted to the top of the frame 140, and has a milled boss 147 bolted to it centrally. The boss 147 carries spaced forward and rearward lugs 148 and 149, of which the rearward lug 149 is pierced as a collar bearing and the forward lug 148 is pierced and threaded. A box-like frame member 150 rests upon the base plate 146 and constitutes the upper way member, having bosses 151 bolted to its lower surface and spaced in parallel to engage slidingly the sides of the boss 147. A slot 152 extends through the bottom of the box-like frame 150 between the bosses 151 to permit the lugs 148 and 149 to extend therethrough into the interior of the frame 150 and to move longitudinally in the slot. Pierced lugs 153 and 154 are secured to the interior surface of the bottom of the frame 150 at the ends of the slot 152 in alignment, when the parts are assembled, with the lugs 148 and 149. An adjusting screw 155 extends through the aligned lugs 153, 148, 149, and 154, being held therein by an expanded head 156 in contact with the lug 154 and by a washer 157 and cotter pin 158 in contact with the lug 153. The threaded portion of the screw 155 engages the threaded lug 148. A crank 159 fits the expanded head 156 and provides a means whereby the screw 155 may be manually turned to advance or retract the frame 150 upon the base plate 146.

Figure 1:
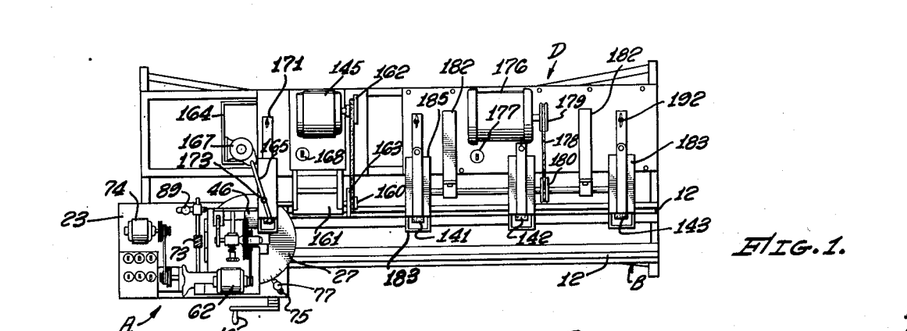
Figure 1 is a plan view of a gemstone machine incorporating the principles of the present invention.
Figure 2:
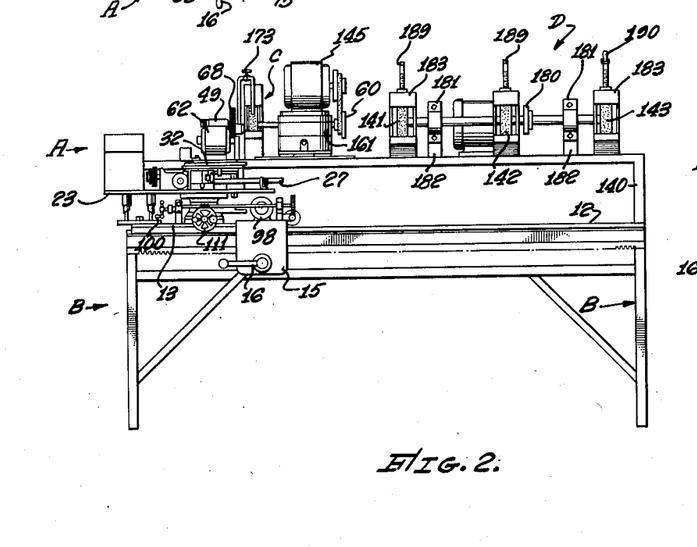
Figure 2 is a frontal elevational view of the gemstone machine shown in Figure 1.
Figure 3:
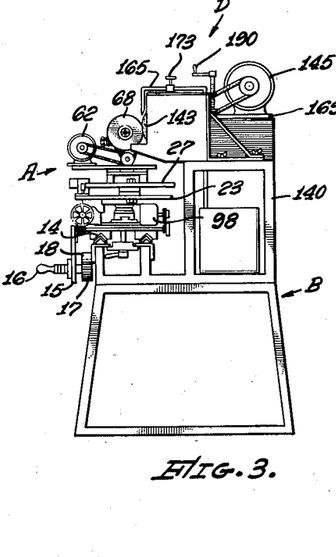
Figure 3 is an end elevational view taken from the right of Figure 2.

The motor 145 drives the grinding wheel C through an arbor 160 (see Figure 1) mounted in bearings 161 upon the forward face of the box-like frame 150, the drive being accomplished through cone pulleys 162 and 163 to permit maintenance of the peripheral speed of the grinding wheel C as the wheel is worn or dressed down. The grinding wheel C turns in a jet of coolant liquid, supplied from a tank 164 through a conduit 165 by means of a pump 166. The pump 166 is driven by a motor 167 which is controlled by a switch 168 (shown in Figures 1 and 20) which also controls the motor 145. A hood 169 and pan 170, held by a bracket 171, collect the coolant liquid to permit its return to the tank 164 through a return conduit 172. A valve 173 is placed in the conduit 165 to regulate the volume of the jet.

The finishing wheels 141, 142, and 143 are all mounted on a shaft 175 which is driven by a motor 176 controlled by a switch 177, the power being applied to the shaft 175 by a belt 178 and driving and driven pulleys 179 and 180. As the wear on the finishing wheels is less than that on the grinding wheel C, there is not the need for the pulleys 179 and 180 to be cone pulleys to maintain a peripheral wheel speed, although of course they may be, if so desired. The motor 176 is based upon the frame 140, and the shaft 175 is mounted in bearings 181 held in brackets 182 also mounted on the frame 140. As it is desirable to have the finishing wheels apply abrasive and polishing pastes to the gemstones, an individual pan 183 is provided for each of the wheels, as shown in Figures 33 and 34, the paste being indicated at 184. The pastes will vary according to the nature and use of the specific finishing wheel, the paste for the cast iron lap wheel 141 being most suitably a thin paste of silicon carbide grit of a medium fineness of about 400 to 600 grit. The paste for the hard felt wheel 142 would suitably be of finer grit, say 1000 to 1600. However, it should be understood that when the wheels 141 and 142 are diamond wheels, no abrasive pastes will be employed, and only a coolant liquid will be applied, preferably by a mechanism such as that hereinabove described in association with the grinding wheel C. The leather buffing wheel 143 would apply a suitable polishing paste of such powders as rouge, tin oxide, or cerium oxide. To prevent spattering, the wheels are partly covered with hoods 185, and the hoods and the pans 183 are arranged to be vertically movable to bring the pastes 184 into contact with the wheels. As shown in Figures 33, 34 and 35, the hoods and pans are secured to guides 186 which have inwardly turned flanges 187 by which they are held slidably on brackets 188. Screws 189, operated by cranks 190, threadedly engage bars 191 secured to the hoods 185, and have their lower ends rotatably secured in the brackets 188. By operation of the cranks 190, the hoods 185, and the pans 183 secured thereto through the guides 186, may be individually raised or lowered to bring the paste 184 in contact level with respect to the individually respective finishing wheel. For adjusting the hoods and pans horizontally so that the various finishing wheels may just be uncovered thereby at the working sectors of their peripheries, the brackets 188 are slidably secured to the frame 140 by wing bolts 192 passing through slots 193 in the bases of the brackets.

Figure 26:
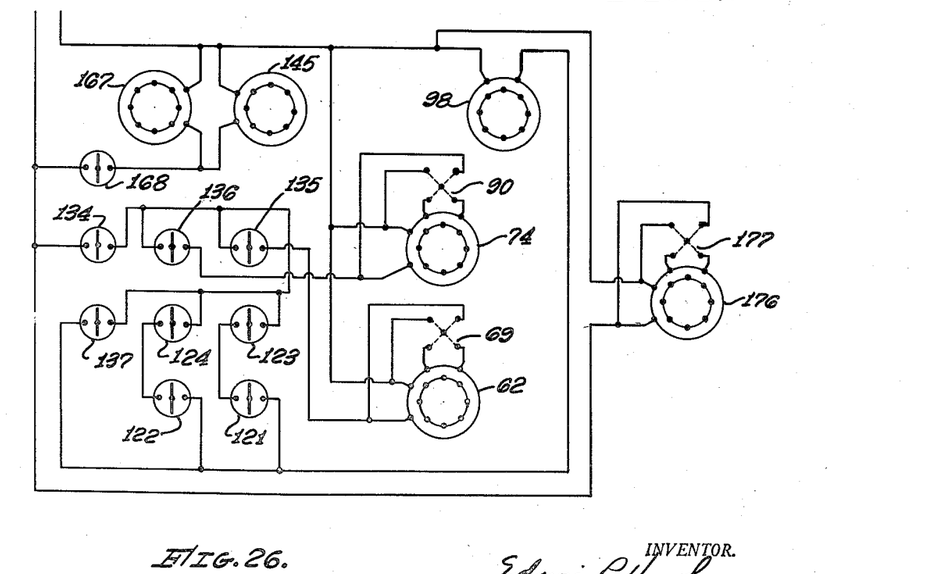
Figure 26 is a diagrammatic view of the wiring system of the machine.

The switch 177, controlling the motor 176, may conveniently be a reversing switch as indicated in Figure 26, to permit full flexibility in the range of polishing operations, although this is not altogether necessary since the direction of rotation of the chuck 50 is reversible by the switch 69 controlling the motor 62.

In shaping and polishing a gemstone upon my machine, I first cement the base of a workpiece 10 of gemstone upon a dop 195, the face 196 whereof has been ground truly perpendicular to the shank 197. I prefer to have the shanks of the dops either triangular or hexagonal in cross-section so that a dop, with gemstone attached, may be removed from the chuck 50 for inspection of the work and may be reinserted in the chuck exactly in its former relation to the cam 54. The dop stem is secured in the chuck 50 so that the gemstone is rotatable about an axis perpendicular to its base, and a cam 54, having the outline shape which it is desired to reproduce in the finished gemstone, is secured to the opposite end of the spindle 51 by the screw 55. The entire head mechanism A is then moved by the crank 16 and pinion 17 to a position in which the workpiece is conveniently proximate to the grinding wheel C and the head is tightened by the locking arm 19 and crank 21. Ordinarily the first grinding operation is that of giving the gemstone its outline shape, and in my machine the bezel cut may be combined therewith. A stone may also have its crown cut first, then its shape and bezel cut. In semi-spherical or carbuncle-shaped stones, no bezel is cut and the crown may be cut first, even simultaneously with the rough shaping. However, the ordinary procedure of first rough shaping the gemstone and simultaneously cutting a bezel, and then cutting a crown, will be herein described, and the possible variations of technique will be apparent from such description to one skilled in the lapidary art.

The final longitudinal position of the workpiece 10 relative to the grinding wheel C is made by turning the crank 100 actuating the upper longitudinal way member 24. Lateral position is attained by turning the crank 102 actuating the intermediate way member 25. The movable bearing 88 is loosened and the worm 73 is taken out of mesh with the worm wheel 27. The worm wheel 27 is then turned manually until the desired bezel angle is registered on the scale 80, and is then locked in place by the toothed bracket 75. So turning and locking the worm wheel 27 turns the spindle 51 a corresponding amount from parallelism to the peripheral face of the grinding wheel C and thereby causes an angular bezel cut on the gemstone. The compression spring 59 is tightened to insure the contact of the cam 54 with the cam follower 57, and the motor 62 is started by the line switch 134, switch 135, and the reversing switch 69. As the cam 54 rotates, the rocker arm 48 is rocked back and forth by the rotating cam 54 so that the workpiece 10 at the other end of the spindle 51 is not only rotated but is rocked back and forth correspondingly with its axis of rotation passing alternately to one side and then the other of the radius of the worm wheel 27 along which the crown curve ways 32 are movable.

The workpiece 10 may be fed towards the grinding wheel C manually by turning the crank 102, or the worm 110 may be meshed with the worm wheel 111 and, the movable bearing 112 having been tightened, the work may be fed mechanically by starting the motor 98. In the former case, the dead-stop 115 is utilized to limit the distance which the intermediate cross ways member may carry the workpiece toward the grinding wheel. Usually a single gemstone, or the first of a plurality of stones which are to be cut to the same size and shape, is shaped by manual operation of the crank 102, with pauses for measuring the stone with micrometer calipers. When the desired size is reached, the micro-switch 122 is set by means of the crank 128 to open at that point, the dead-stop 115 is set to correspond therewith, and the grinding of other stones to the same size and shape is performed by feeding them to the grindstone by the mechanical-electrical drive.

When the bezel is properly reduced, the gemstone is moved back from the grinding wheel C by turning the crank 102. When the bezel of one stone is cut, the bezel may be polished as hereinafter described, or the crown may be cut immediately, or the bezeled stone may be removed from the chuck and the bezels of any quantity of stones may be cut in succession by the action just described. Then the machine may be adjusted for crown cutting and the crowns may be cut on all of the stones ready by chucking them in succession. The intersection of the bezel cut and the crown is known as the bezel line.

In cutting a crown, the gemstone is moved to the proximity of the grinding wheel C by means of the cranks 16, 100, and 102, as in the case of bezel cutting. However, as preliminary steps, the crown curve ways 32 are adjusted to give the desired curvature to the crown and the worm wheel 27 is turned to cause the gemstone to face the peripheral grinding face of the grinding wheel; the worm wheel being left unlocked in that position and the worm 73 being placed in mesh therewith. The wiper arms 91 and 92 are set to cause reversal of the motor 74 by acting on the reversal switch 90 at the ends of the desired oscillating sweep of the gemstone across the face of the grinding wheel. In adjusting the crown curve ways, its crank is used to advance or retract the crown curve ways 32 radially on the worm wheel 27 until the reading on the scale 70 indicates a degree of eccentricity of the gemstone relative to the worm wheel 27 which will produce the desired radius of curvature of the crown on the greatest diameter of the gemstone.

If, as is usual, a convex crown is to be cut, the scale reading should be plus. A concave surface on a gemstone may be hollowed out by setting the scale to a minus distance. The distance indicated by the scale 70 will be the distance from the face of the crown to the center of rotation of the worm wheel 27, the measurement being taken from any point on the crown on the greatest diameter of the stone since the crown will be a segment of circle based upon the bezel line as a chord. It follows that, given the greatest diameter of the stone at the bezel line and the desired height of the crown above the bezel line, the radius of curvature of the crown will be the square of the crown height plus one half the square of the greatest bezel line diameter, divided by twice the crown height. This radius may be set off on the scale 70, and the micro-switch stop 121 and dead-stop 116 may be set to stop the mechanical feed of the work when the center of rotation of the worm wheel 27 is at a distance from the grinding wheel C equal to this radius. Of course, when the above calculations are made and utilized, rather than a trial approach, the dops 195 must be so set in the chuck 50 that the bezel line has a constant spaced relationship to the chuck, which in turn has a fixed spaced relationship to the crown curve cross ways 32 carrying the scale 70.

The normal convex crown, most pleasing to the eye, is cut when the radius of curvature is between plus one inches and plus three inches, the amount depending on the size, shape, thickness, and use of the gemstones. For example, on a gemstone one and two-tenths inches in diameter, three-sixteenths of an inch thick, with a bezel cut at fifteen degrees, and with the crown curve ways set at plus two inches, the finished gemstone will have a crown thickness and bezel thickness of almost exactly three thirty-seconds of an inch each and the gemstone will be well proportioned. To cut a small hemisphere, as when making a carbuncle cut cabochon, the crown curve ways are set at a plus reading of the scale 70 so as to place the surface of the finished hemisphere at a distance in front of the center of rotation of the worm wheel 27 exactly equal to the radius of the hemisphere. For example, on a one-half inch carbuncle the crown curve ways are set at plus one-quarter inch.

It should be noted that the rocking motion provided by the cam 54 combines with the oscillating movement of the worm wheel 27 to produce smooth crowns on either round or elongated gemstones, with the crowns intersecting the previously reduced bezel at a bezel line which is sharp, continuous, and at every point parallel to the base edge of the stone. This parallelism results from the fact that in crown cutting any cut generated on the rotating crown concentric therewith is momentarily a bezel cut, except that the bezel angle is not fixed as in bezel cutting, but due to the uniform oscillating movement is constantly changing. Such a cut, if the oscillation were stopped at any point, would generate a bezel of the angle at which the stop was made. The speed of the grinding wheel C, as well as that of the rotating and rocking gemstone, produces in conjunction with the relatively slow oscillation and feeding movements a uniformly smooth surface and not a series of concentrically intersecting bezels.

It will now be apparent why dual micro-switches 121 and 122 and dual dead-stops 115 and 116 are utilized. In bezel cutting, the center of the dop face 196 is at a final distance from the grinding wheel C dependent on the diameter of the gemstone, and in crown cutting it is at a final distance dependent on the thickness of the gemstone, and furthermore, it approaches the wheel at a different angle. Consequently, the depths of feed of the two kinds of cut may be quite different. In order to leave the machine adjusted for each kind of cut while shifting back and forth from bezel cutting to crown cutting on a plurality of similarly shaped stones, the dual system of stops is installed, and the stops momentarily not in use are inactivated, either by swivelling the dead-stops out of place or by simply breaking the electric circuit at the snap switch 123 or 124 in series with the inactive micro-switch and closing the other parallel circuit.

After reduction to size and shape on the grinding wheel C, the roughed-out gemstone is brought in close contact successively with the finishing wheels D. Movement of the head mechanism A to proximity with the wheels D is attained by use of the crank 16, with final adjustment and such feeding movement as may be necessary during polishing attained by use of the cranks 100 and 102. In the finishing process, one stone may have its bezel worked and then its crown worked on each wheel successively, or it may have its bezel worked on each wheel and then its crown worked on each wheel. The bezels and likewise the crowns of any number of stones may be worked on each wheel by chucking them in succession. In production, I prefer to work all the bezels that are ready on one wheel, and then all the crowns, before moving the head mechanism A to the next wheel, since it requires less time to re-chuck than to move the head each time an operation is completed.

I claim:

1. In a gemstone machine, the combination of a grinding wheel, at least one finishing wheel in substantial facial alignment with said grinding wheel, a head mechanism movable with respect to said wheels for feeding a gemstone in reducing relationship therewith, means for moving said head mechanism so as to bring said gemstone selectively proximate to any of said wheels, means for adjusting the position of said wheels relative to the axis of movement of said head mechanism, compound ways forming part of said head mechanism for feeding said gemstone into working contact with said wheels, means for limiting to a predetermined distance the feeding of said gemstone in a direction at a right angle to the working surface of said wheels, means rotatable on a vertical axis and supported by said compound ways for altering the horizontal angle of approach of said gemstone to said wheels, means for rotatively oscillating said rotatable means through a predetermined angle of oscillation, means for locking said rotatable means at predetermined angles to the axis of movement of said head mechanism, a spindle revolubly supported by said rotatable means and including means for supporting said gemstone so as to rotate said gemstone about an axis perpendicular to the base thereof, means for moving said spindle along a radius of said rotatable means so as to posit said gemstone at a variable eccentricity with respect to said rotatable means, and means for rocking said spindle so as to cause said axis of said gemstone to oscillate from one side to the other side of said radius of said rotatable means while remaining parallel to said radius.

2. In a gemstone machine, the combination of reducing means, a head mechanism movable with respect to said reducing means for feeding a gemstone in reducing relationship therewith, means for moving said head mechanism so as to bring said gemstone proximate to selective portions of said reducing means, means for adjusting the position of said reducing means relative to the axis of movement of said head mechanism, compound ways forming part of said head mechanism for feeding said gemstone into working contact with said reducing means, means for limiting to a predetermined distance the feeding of said gemstone in a direction at a right angle to the working surface of said reducing means, means rotatable on a vertical axis and supported by said compound ways for altering the horizontal angle of approach of said gemstone to said reducing means, means for rotatively oscillating said rotatable means through a predetermined angle of oscillation, means for locking said rotatable means at predetermined angles to the axis of movement of said head mechanism, a spindle revolubly supported by said rotatable means and including means for supporting said gemstone so as to rotate said gemstone about an axis perpendicular to the base thereof, means for moving said spindle along a radius of said rotatable means so as to posit said gemstone at a variable eccentricity with respect to said rotatable means, and means, inclusive of a cam mounted on said spindle, for rocking said spindle so as to cause said axis of said gemstone to follow a path parallel to the path followed by the axis of said cam.

3. In a gemstone machine, the combination of reducing means, a head mechanism movable with respect to said reducing mechanism for feeding a gemstone into reducing contact therewith, a revoluble spindle so mounted as to be capable of rocking motion transversely to its longitudinal axis, means for securing a gemstone to said spindle for rotation thereby, cam means, means for securing said cam means to said spindle in axial parallelism with said gemstone, follower means engageable with said cam for causing said rocking motion of said spindle when said spindle is rotated, rotatable means supporting said spindle for altering the angle of approach of said gemstone to said reducing means, means for moving said rotatable means relatively to said reducing means, and means for moving said spindle along a radius of said rotatable means.

4. In a gemstone machine, the combination of reducing means, a head mechanism movable with respect to said reducing means for feeding a gemstone into reducing contact therewith, a revoluble spindle so mounted as to be capable of rocking motion transversely to its longitudinal axis, means for securing a gemstone to said spindle for rotation thereby, cam means, means for securing said cam means to said spindle in axial parallelism with said gemstone, follower means engageable with said cam for causing said rocking motion of said spindle when said spindle is rotated, rotatable means supporting said spindle for altering the angle of approach of said gemstone to said reducing means, means for moving said spindle in two directions perpendicular to each other relatively to said reducing means, and means for moving said spindle along a radius of said rotatable means.

5. In a gemstone machine of the character described, the combination of reducing means, a head mechanism for feeding a gemstone into reducing contact with said reducing means, a revoluble spindle so mounted as to be capable of rocking motion transversely to its axis of rotation, means for securing a gemstone to said spindle so as to be rotated thereby, supporting means for said spindle rotatable about an axis normal to the axis of rotation of said spindle for altering the angle of approach of said gemstone to said reducing means, means for rocking said spindle so as to cause the axis of rotation of said gemstone to oscillate in a predetermined path normal to the path of approach of said gemstone to said reducing means, and means for moving said spindle longitudinally along a path radial to the axis of rotation of said supporting means.

6. In a gemstone machine of the character described, the combination of reducing means, a spindle revolubly mounted with its axis of rotation normally in a plane radial to the hereinafter mentioned rotatable supporting means, and so mounted as to be capable of rocking movement into planes parallel with said plane, means for securing a gemstone to said spindle so as to be rotatable thereby, supporting means for said spindle rotatable about an axis normal to the axis of rotation of said spindle, means for moving said supporting means relatively to said reducing means in two paths perpendicular to each other so as to bring said gemstone into reducing contact with said reducing means, and means for rocking said spindle so as to cause the axis of rotation of said gemstone to oscillate in a predetermined path normal to the path of approach of said gemstone to said reducing means.

7. In a gemstone machine of the character described, the combination of reducing means, a spindle revolubly mounted with its axis of rotation normally in a plane radial to the hereinafter mentioned rotatable supporting means, and so mounted as to be capable of rocking movement into planes parallel with said plane, means for securing a gemstone to said spindle so as to be rotatable thereby, supporting means for said spindle rotatable about an axis normal to the axis of rotation of said spindle, means for moving said supporting means relatively to said reducing means in two paths perpendicular to each other so as to bring said gemstone into reducing contact with said reducing means, means for locking said supporting means at selective degrees of rotation determining the angle of approach of said gemstone to said reducing means, and means for rocking said spindle so at to cause the axis of rotation of said gemstone to oscillate in a predetermined path normal to the path of approach of said gemstone to said reducing means.

8. In a gemstone machine of the character described, the combination of a plurality of reducing wheels, a spindle revolubly mounted with its axis of rotation normally in a plane radial to the hereinafter mentioned rotatable supporting means, and so mounted as to be capable of rocking movement into planes parallel with said plane, means for securing a gemstone to said spindle so as to be rotatable thereby, supporting means for said spindle rotatable about an axis normal to the axis of rotation of said spindle, means for moving said supporting means relatively to said reducing wheels so as to bring said gemstone into reducing contact with said reducing wheels, and means for rocking said spindle so as to cause the axis of rotation of said gemstone to oscillate in a predetermined path normal to the path of approach of said gemstone to said reducing wheels.

9. In a gemstone machine of the character described, the combination of reducing means, a spindle revolubly mounted with its axis of rotation normally in a plane radial to the hereinafter mentioned rotatable supporting means and so mounted as to be capable of rocking movement into planes parallel with said plane, means for securing a gemstone to said spindle so as to be rotatable thereby, supporting means for said spindle rotatable about an axis normal to the axis of rotation of said spindle, means for moving said supporting means relatively to said reducing means in two paths perpendicular to each other, one of which is perpendicular to the working face of said reducing means so as to bring said gemstone into reducing contact with said reducing means, dual means individually adjustable for arresting the movement of said supporting means toward said reducing means in said one path at selective points, so arranged and constructed that either of said dual means may be made temporarily ineffective to arrest said movement while otherwise maintaining its adjustment, and means for rocking said spindle so as to cause the axis of rotation of said gemstone to oscillate in a predetermined path normal to the path of approach of said gemstone to said reducing means.

10. In a gemstone machine of the character described, the combination of reducing means, a spindle revolubly mounted with its axis of rotation normally in a plane radial to the hereinafter mentioned rotatable supporting means and so mounted as to be capable of rocking movement into planes parallel with said plane, means for securing said gemstone to said spindle so as to be rotatable thereby, supporting means for said spindle rotatable about an axis normal to the axis of rotation of said spindle, means for moving said supporting means relatively to said reducing means in two paths perpendicular to each other, one of which is perpendicular to the working face of said reducing means so as to bring said gemstone into reducing contact with said reducing means, dual means individually adjustable for arresting the movement of said supporting means toward said reducing means in said one path at selective points, at least one of said arresting means being so arranged and constructed that it may be made temporarily ineffective to arrest said movement while otherwise maintaining its adjustment, and means for rocking said spindle so as to cause the axis of rotation of said gemstone to oscillate in a predetermined path normal to the path of approach of said gemstone to said reducing means.

11. In a gemstone machine of the character described, the combination of reducing means, a spindle, means for securing a gemstone to said revoluble spindle so as to be rotated thereby, supporting means for said spindle rotatable about an axis normal to the axis of rotation of said spindle, manually operative means for moving said supporting means relatively to said reducing means in two paths perpendicular to each other, one of which is perpendicular to the working face of said reducing means, electrically operative means alternative to said manually operative means for moving said supporting means in said one path, and dual electric circuits in parallel controlling said electrically operative means, and each inclusive of a master switch and of a micro-switch in series therewith, said micro-switches being individually adjustable to open and close the circuits respective thereto at selective points in the traverse of said supporting means of said one path.

12. In a gemstone machine of the character described, the combination of a plurality of reducing wheels, a revoluble spindle so mounted as to be capable of rocking motion transversely to its axis of rotation, means for securing a gemstone to said spindle so as to be rotated thereby, supporting means for said spindle rotatable about an axis normal to the axis of rotation of said spindle, means for moving said supporting means relatively to said reducing wheels so as to bring said gemstone into reducing contact with said reducing wheels, reversible driving means for oscillatingly rotating said supporting means, means for moving said spindle longitudinally relatively to said supporting means, and means for rocking said spindle so as to cause the axis of rotation of said gemstone to oscillate in a predetermined path normal to the path of approach of said gemstone to said reducing wheels.

13. In a gemstone machine of the character described, the combination of reducing means, a revoluble spindle, means for securing a gemstone to said spindle so as to be rotated thereby, means connected with said spindle for causing the axis of rotation of said gemstone to follow a predetermined path, a worm wheel radially supporting said spindle, rotatable about an axis normal to the axis of rotation of said spindle, a worm engageable with said worm wheel and disengageable therefrom to permit manual rotation thereof, a reversible motor for driving said worm, a reversing switch for said motor, wiper arms rotatable with said worm wheel and engageable with said reversing switch to reverse said motor, and disposable selectively relative to said worm wheel so as to cause oscillating rotation thereof between the limits of a selectable sector thereof, means for moving said worm wheel relatively to said reducing means in two paths perpendicular to each other, one of which is perpendicular to the working face of said reducing means so as to bring said gemstone into reducing contact with said reducing means, dual means individually adjustable for arresting the movement of said worm wheel toward said reducing means in said one path either at selective points, so arranged and constructed that either of said dual means may be made temporarily ineffective to arrest said movement while otherwise maintaining its adjustment, and means for moving said spindle longitudinally relative to said worm wheel.

14. In a gemstone machine, the combination of reducing means, a head mechanism movable with respect to said reducing means for feeding a gemstone in reducing relationship therewith, means for moving said head mechanism so as to bring said gemstone proximate to selective portions of said reducing means, compound ways forming part of said head mechanism for feeding said gemstone into working contact with said reducing means, means for limiting to a predetermined distance the feeding of said gemstone in a direction at a right angle to the working surface of said reducing means, means rotatable on a vertical axis and supported by said compound ways for altering the horizontal angle of approach of said gemstone to said reducing means, means for rotatively oscillating said rotatable means through a predetermined angle of oscillation, means for locking said rotatable means at predetermined angles to the axis of movement of said head mechanism, a spindle revolubly supported by said rotatable means and including means for supporting said gemstone so as to rotate said gemstone about an axis perpendicular to the base thereof, means for moving said spindle along a radius of said rotatable means so as to posit said gemstone at a variable eccentricity with respect to said rotatable means, and means for rotating said spindle about its own axis.

15. In a gemstone machine, the combination of reducing means, a head mechanism movable with respect to said reducing means for feeding a gemstone in reducing relationship therewith, means for moving said head mechanism so as to bring said gemstone proximate to selective portions of said reducing means, compound ways forming part of said head mechanism for feeding said gemstone into working contact with said reducing means, means for limiting to a predetermined distance the feeding of said gemstone in a direction at a right angle to the working surface of said reducing means, means rotatable on a vertical axis and supported by said compound ways for altering the horizontal angle of approach of said gemstone to said reducing means, means for rotatively oscillating said rotatable means through a predetermined angle of oscillation, means for locking said rotatable means at predetermined angles to the axis of movement of said head mechanism, a spindle revolubly supported by said rotatable means and including means for supporting said gemstone so as to rotate said gemstone about an axis perpendicular to the base thereof, means for moving said spindle along a radius of said rotatable means so as to posit said gemstone at a variable eccentricity with respect to said rotatable means, and means for rotating said spindle optionally in either direction about its own axis.

16. In a gemstone machine, the combination of reducing means, a head mechanism for feeding a gemstone into reducing contact therewith, a revoluble spindle so mounted as to be capable of rocking motion transversely to its longitudinal axis, means for securing a gemstone to said spindle for rotation thereby, cam means, means for securing said cam means to said spindle in axial parallelism with said gemstone, follower means engageable with said cam for causing said rocking motion of said spindle when said spindle is rotated, rotatable means supporting said spindle for altering the angle of approach of said gemstone to said reducing means, and means for moving said rotatable means relatively to said reducing means.

17. In a gemstone machine, the combination of reducing means, a head mechanism movable with respect to said reducing means for feeding a gemstone into reducing contact therewith, a revoluble spindle so mounted as to be capable of rocking motion transversely to its longitudinal axis, means for securing a gemstone to said spindle for rotation thereby, cam means, means for securing said cam means to said spindle in axial parallelism with said gemstone, follower means engageable with said cam for causing said rocking motion of said spindle when said spindle is rotated, rotatable means supporting said spindle for altering the angle of approach of said gemstone to said reducing means, and means for moving said spindle in two directions perpendicular to each other relatively to said reducing means.

EDWIN P. VAN LEUVEN.

REFERENCES CITED

The following references are of record in the file of this patent:

UNITED STATES PATENTS

| Number | Name | Date |
| --- | --- | --- |
| 481,192 | Richards | Aug. 23, 1892 |
| 943,191 | Hull | Dec. 14, 1909 |
| 1,033,640 | Wall et al. | July 23, 1912 |
| 1,097,302 | Conner et al. | May 19, 1914 |
| 1,461,149 | Hunt | July 10, 1923 |
| 1,651,533 | Maynard | Dec. 6, 1927 |
| 2,021,066 | Huxford et al. | Nov. 12, 1935 |
| 2,037,002 | Belden et al. | Apr. 14, 1936 |
| 2,163,987 | Smith | June 27, 1939 |
| 2,164,155 | Lemay | June 27, 1939 |
| 2,185,546 | Flygare | Jan. 2, 1940 |
| 2,209,605 | Maynard | July 30, 1940 |
| 2,269,805 | Arter | Jan. 13, 1942 |
| 2,340,096 | Woodbury et al. | Jan. 25, 1944 |
| 2,384,253 | Jearum | Sept. 4, 1945 |
| 2,418,085 | Mulholland et al. | Mar. 25, 1947 |
| 2,423,367 | Bolender | July 1, 1947 |
| 2,429,464 | Jearum | Oct. 21, 1947 |